United States Patent [19]

Boyd et al.

[11] 4,275,105

[45] Jun. 23, 1981

[54] STABILIZED RAYON WEB AND STRUCTURES MADE THEREFROM

[75] Inventors: William J. Boyd; Mary K. King, both of Memphis, Tenn.

[73] Assignee: The Buckeye Cellulose Corporation, Cincinnati, Ohio

[21] Appl. No.: 916,220

[22] Filed: Jun. 16, 1978

[51] Int. Cl.³ .............................................. B32B 27/14
[52] U.S. Cl. .................................... 428/198; 128/296; 428/219; 428/284; 428/286; 428/287; 428/290; 428/296; 428/298; 428/300; 428/301; 428/910; 428/913
[58] Field of Search ............... 428/284, 286, 287, 289, 428/290, 296, 297, 298, 300, 301, 903, 913, 282, 198, 219; 128/132 D, 156, 296

[56] References Cited

U.S. PATENT DOCUMENTS

| | | | |
|---|---|---|---|
| 2,862,251 | 12/1958 | Kalwaites | 428/357 |
| 3,416,526 | 12/1968 | Yeremian | 128/296 |
| 3,485,706 | 12/1969 | Evans | 428/134 |
| 3,486,168 | 12/1968 | Evans et al. | 19/161 |
| 3,507,943 | 4/1970 | Such et al. | 428/198 |
| 3,837,995 | 9/1974 | Floden | 428/285 |
| 3,916,447 | 11/1975 | Thompson | 428/296 |
| 3,965,906 | 6/1976 | Karami | 128/156 |
| 4,077,410 | 3/1978 | Butterworth et al. | 128/156 |
| 4,159,360 | 6/1979 | Kim | 428/198 |

Primary Examiner—James J. Bell
Attorney, Agent, or Firm—Frost & Jacobs

[57] ABSTRACT

A stabilized absorbent rayon web which may be used alone or which may serve as outer plies for absorbent structures. The rayon web may be a spunbonded web or an air laid, wet laid or carded web of staple length or longer fibers, with substantial fiber orientation in a direction perpendicular to the plane of the web by virtue of the way in which the web is formed or by virtue of mechanical or hydraulic needling. The thermoplastic web is melted into the rayon web from the bottom surface thereof to a controlled penetration depth of from about 10% to about 40% and preferably from about 10% to about 25%. As a result, the cross over points of the rayon fibers are effectively stabilized from the bottom of the rayon web to the controlled penetration depth therein while the aesthetics of the upper surface of the rayon web are undisturbed. The thermoplastic web may be of any appropriate polymer and any structural form having an open area of at least about 40%. The stabilized rayon web demonstrates improved resistance to surface abrasion, improved tensile strength, improved wet bulk and resiliency and improved dimensional stability, both wet and dry. The bottom surface of the stabilized rayon web can be heat bonded to other webs without the use of additional thermoplastic material.

45 Claims, 15 Drawing Figures

STABILIZED RAYON WEB AND STRUCTURES MADE THEREFROM

BACKGROUND OF THE INVENTION

1. Field of the Invention

The invention relates to a stabilized absorbent rayon web and more particularly to such a web demonstrating an improved resistance to surface abrasion, improved dimensional stability, and to structures made with such a web.

2. Description of the Prior Art

The stabilized absorbent rayon web of the present invention has many uses. It may be used alone or as outer plies for a wide variety of absorbent structures. While not intended to be limiting, an exemplary list of such structures may include washcloths, towels, bandages and dressings, surgical towels, surgical sponges and gauze-like structures. The stabilized rayon web of the present invention is particularly well suited for use as or in surgical structures because it is absorbent, soft, pliable, conformable and cloth-like, with excellent drape and hand. The stabilized rayon web maintains these desirable attributes even when wet. The outer or upper surface of the stabilized rayon web is non-abrasive and thus would not be abrasive to delicate tissues in the body when used as a surgical aid. Of great importance to the use of this material in surgical structures is the fact that the stabilized rayon web requires no additives such as bonding agents, surfactants (including wetting agents), surface finishes or the like. Any of these agents can cause concern from the aspect of safety when used in contact with delicate body tissues. The thermoplastic web used to stabilize the rayon web can readily be selected from thermoplastic materials generally recognized to be safe for surgical uses.

Prior art workers have devised a number of rayon or rayon-containing nonwoven webs or fabrics stabilized to maintain their integrity as a web.

Early examples were webs of all rayon staple length fibers or a blend of rayon and other staple length fibers, either air laid, wet laid or carded and bound together by saturating the web totally or intermittently with a bonding agent. The web was stabilized throughout its thickness and the bonding agent constituted an additive.

Another such stabilized web comprised a blend of staple length rayon fibers and thermoplastic staple length fibers. The thermoplastic fibers were uniformly distributed throughout the thickness of the web. The web was carded and heat embossed. While the embossing tended to stabilize the web, the thermoplastic penetrated throughout the web, rather than from the bottom surface of the web to a controlled depth therein. The embossing also resulted in an alteration and compaction of the web surface. Such a fabric is was for example, in U.S. Pat. No. 3,507,943, in the names of J. J. Such and A. R. Olson, issued Apr. 21, 1970.

U.S. Pat. No. 2,862,251, in the name of Frank Kalwaites, issued Dec. 2, 1958, taught a web of staple length rayon fibers, which was hydraulically needled and treated with an acrylic latex bonding agent for stabilization. Again, the web was stabilized throughout its thickness, tending to detract from its surface aesthetics. This web also lacked wet bulk and resiliency.

Yet another prior art stabilized web was taught in U.S. Pat. No. 3,485,706, in the name of Franklin J. Evans, issued Dec. 23, 1969 and U.S. Pat. No. 3,486,168 in the names of Franklin J. Evans and Ronald J. Summers, issued Dec. 23, 1969. The web constituted an unbonded web of staple length rayon fiber which was hydraulically needled.

Prior art workers have produced rayon webs of carded or air laid staple length rayon fibers, which have been stitched in the machine direction by using continuous filament polyester thread. Such webs were not strongly resistant to surface abrasion and linting due to an abundance of free fiber ends. Additionally, these nonwovens raveled at the cut edges unless stitched, thus increasing the propensity to lint.

Spunbonded webs of rayon are available. Such webs demonstrate excellent drape and hand and are soft, pliable and conformable. By virtue of the fact that they are spunbonded and hence are continuous filament-type webs, the amount of available particulate material or lint that can fall off or be released from such webs during use is greatly reduced. This is true largely due to the absence of fiber ends which could break off when mechanical energy is applied to the surface of these webs. Such webs are, however, lacking in tensile strength and dimensional stability, particularly when wet. As used herein, the phrase "dimensional stability" relates to resistance to non-recoverable deformation by elongation or stretching. Such webs demonstrate poor wet bulk. As used herein, the phrase "wet bulk" relates to the resistance to the loss of form and resiliency when wet. The surface of these webs is not stable or resistant to abrasion, and although lint is not likely to be released, the surface fibers will become disentangled with mechanical working, reducing the usefulness of the material. This is due to relatively weak cross-over bonding at filament intersections.

Unlike prior art rayon webs, the stabilized absorbent rayon web of the present invention combines dimensional stability (both wet and dry) and enhanced tensile strength with excellent cloth-like surface characteristics and resistance to abrasion and linting. The teachings of the present invention enable spunbonded and staple length discontinuous fiber rayon webs, with their desirable aesthetics and functionality, to be used in end products where strength, surface abrasion resistance and dimensional stability requirements would normally preclude their use. This is especially true if the end product is to be used in the wet condition.

SUMMARY OF THE INVENTION

The present invention is directed to a stabilized absorbent rayon web. The web may be used alone as such, or it may be employed as the outer plies of many types of absorbent structures.

The rayon web starting material may constitute a spunbonded rayon web or an air laid, wet laid or carded web of staple length or longer fibers. When the web is made up of discontinuous fibers of staple length or longer, there should be substantial fiber orientation in the Z direction within the web by virtue of the way in which the web is formed or by virtue of mechanical or hydraulic needling. As used herein, the term "Z direction" is intended to refer to a direction substantially perpendicular to the plane of the web. Particularly when the stabilized rayon web of the present invention is intended for surgical uses or as a part of a structure intended for surgical uses, the rayon web starting material should be free of additives such as surface finishes, surfactants (including wetting agents), and bonding agents.

The rayon web starting material is laid up with a thermoplastic web which is caused to be melted into the rayon web from its bottom surface to a controlled penetration depth within the rayon web of from about 10% to about 40%, and preferably from about 10% to about 25%. This results in the cross-over points of the rayon fibers being effectively stabilized from the bottom surface of the rayon web to the controlled penetration depth therein. For webs with substantial Z direction fiber orientation, this back-side stabilization effectively stabilizes the surface fibers. The aesthetics of the upper surface of the stabilized rayon web remain undisturbed. As used herein and in the claims, the word "aesthetics" is intended to refer to softness, tactility, texture, appearance and other properties contributing to the overall impression of the material.

The thermoplastic web can be of any suitable polymer and can have many structural forms so long as it has an open area of at least about 40% so as to permit the free passage of liquids therethrough.

The controlled penetration of the rayon web by the thermoplastic web can be accomplished in any appropriate manner such as causing these webs to pass between a heated roll and a back-up roll (or cooperating wrapped apron arrangement) under appropriate pressure, temperature and web speed conditions.

The resulting stabilized rayon web, by virtue of the presence of the thermoplastic, is bondable to other materials either by overall heat bonding or spot heat bonding. The term "spot bonding" as used herein and in the claims is intended to be inclusive of continuous or discontinuous pattern bonding, uniform or random point bonding or combinations thereof, all as are well known in the art. Thus, by such overall or spot heat bonding the stabilized rayon web may be used to serve as cover or outer plies for any functionally absorbent or non-absorbent core ply or plies such as tissue, wadding, fluff, thermoplastic webs and the like, as will be shown hereinafter. Alternatively, such rayon outer plies may be joined to one or more core plies through the use of an appropriate bonding agent such as a latex bonding agent, a hot melt bonding agent, or the like, as is known in the art.

The rayon web starting material may be simultaneously laminated to a variety of other webs during the stabilization procedure to form a stabilized unit. Thus, the rayon web starting material, the stabilizing thermoplastic web and a third web may all be caused to pass through the nip of the heated roll and the back-up roll during the stabilization step. This third web can constitute another rayon web, another thermoplastic web, a tissue web, a fabric web or the like.

The stabilized rayon web of the present invention demonstrates improved resistance to surface abrasion, essentially no particulate discharge (lint or the like), improved tensile strength and increased wet bulk. It is also characterized by greatly improved dimensional stability (both wet and dry, and both in the machine direction and the cross direction). After mechanical treatment such as compaction or creping, when required, the stabilized rayon web is soft, pliable, conformable and has excellent drape and hand. The stabilized web may be sterilized for surgical uses.

DESCRIPTION OF THE PREFERRED EMBODIMENTS

Figure 1:
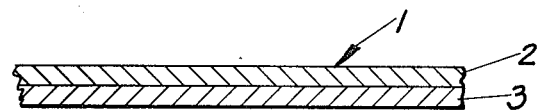
FIG. 1 is a semi-diagrammatic, fragmentary, cross sectional view of a stabilized rayon web of the present invention.

The stabilized rayon web of the present invention is illustrated in its simplest form in FIG. 1. In FIG. 1 the stabilized rayon web is generally indicated at 1 and comprises a rayon ply 2 and a thermoplastic ply 3. It will be understood that the plies 2 and 3 have been greatly exaggerated in thickness, for purposes of clarity. The plies of all of FIGS. 3-7 and 9-13 are also shown exaggerated in thickness for this reason.

The rayon ply may constitute a continuous filament, spunbonded rayon web or an air laid, wet laid or carded web of rayon fibers of staple length or longer (i.e. at least about 1.0 cm). When the web is made up of discontinuous fibers of staple length or longer, there should be substantial fiber orientation in the Z direction within the web by virtue of the way the web is formed or by virtue of mechanical or hydraulic needling. The rayon ply should have a basis weight within the range of from about 20 to about 75 g/m$^2$ and preferably from about 20 to about 35 g/m$^2$.

Excellent results have been achieved utilizing a continuous filament, nonwoven, spunbonded rayon web produced by Asahi Chemical Industries, Limited, of Osaka, Japan and sold under the trademark "Bemliese". This material is taught in U.S. Pat. No. 3,906,130 in the names of Takshi Tsurumi, Shuichi Emori, Kiyokazu Daigoh, Takemi Ikegami and Tutomu Kaneko, issued Sept. 16, 1975. This spunbonded web is fabric-like in that it is soft, pliable, conformable and possesses excellent drape and hand. It is particularly advantageous for surgical uses since it is a continuous filament web which reduces the available particulate matter or lint that can fall off or be released, due to the absence of fiber ends which could break off when subjected to mechanical energy. The material is also non-abrasive to delicate tissue. "Bemliese" contains no additives such as surfaces finishes, surfactants (including wetting agents) or bonding agents which might leach into a wound. This material is, however, lacking in tensile strength, dimensional stability, surface stability and wet bulk.

Another excellent rayon web starting material is sold by E. I. Dupont de Nemours, of Wilmington, Del. under the trademark "Sontara". This rayon web comprises a web of staple length rayon fibers which is hydraulically needled. This web also contains no additives or bonding agents and has excellent cloth-like characteristics. The material does, however, lack wet bulk and loses surface aesthetics when wet.

The thermoplastic web 3 may be of any appropriate polymer and many structural forms having an open area of at least about 40%. The thermoplastic web should have a basis weight of from about 5 to about 25 g/m$^2$. The thermoplastic web may constitute an expanded film, an extruded and embossed web, a melt blown web or a spunbonded web. The polymers from which the thermoplastic web 3 is made can vary widely. Polyethylene, polypropylene, ethyl vinyl acetate, polyester, polyurethane, ethylene methyl acrylate, nylon or the like may be used. The thermoplastic web 3 should have a low melting point of from about 110° C. to about 177° C. and preferably from about 121° C. to about 149° C.

Excellent results have been achieved utilizing a thermoplastic web manufactured by PNC Corporation of Akron, Ohio, under the trademark "Sharnet". This thermoplastic material comprises an expanded and opened film of polymers of the type listed above or blends thereof. "Sharnet" is soft, very drapable and conformable. It has an open area such as to allow free passage of fluids therethrough and can be readily heat bonded to a rayon web or ply.

Another material which has been used with excellent results is manufactured by Hercules, Inc. of Wilmington, Del. under the trademark "Delnet". "Delnet" is a thermoplastic made by a process of extrusion, embossing, and orientation. The embossing technique results in a product having a surface pattern which may be described as a series of hexagonal bosses connected to each other by a series of bars. "Delnet" has an open area of from about 45% to about 50% which allows free passage of fluids therethrough and enhances the thermoplastic material's pliability, drape and aesthetic properties. "Delnet" can readily be heat bonded to a rayon web.

Returning to FIG. 1, stabilization of rayon ply 2 is brought about by locating the thermoplastic ply 3 adjacent to the underside of rayon ply 2 and causing the thermoplastic ply to melt into the rayon ply from its underside to a controlled depth of from about 10% to about 40% and preferably from about 10% to about 25% of the thickness of the rayon ply. The stabilized rayon web 1 of FIG. 1 is, for purposes of clarity, illustrated as being made up of two distinct plies 2 and 3. It will be understood, however, that the thermoplastic ply 3 is melted into the rayon ply 2 to the above stated controlled depth. This is true of all of the stabilized rayon webs illustrated in the Figures.

Figure 2:
FIG. 2 is a scanning electron micrograph of a section of the structure of FIG. 1, at 190× magnification.

FIG. 2 is a scanning electron micrograph (190×) of a section of the stabilized web of FIG. 1 illustrating a polyethylene "Delnet" web of a basis weight of 11 g/m$^2$ melted into a "Bemliese" web of a basis weight of 30 g/m$^2$ to a controlled penetration depth of about 20% of the thickness of the "Bemliese" web. This was accomplished at a pressure of 34 newtons per square meter and at a temperature of 140° C.

The controlled penetration of the rayon web 2 by the thermoplastic web 3 results in those cross-over points of the rayon fibers of web 2 (within the area of penetration by the thermoplastic web) being effectively stabilized. This leaves the aesthetics of the upper surface of rayon web 2 undisturbed. The controlled penetration of rayon web 2 by thermoplastic web 3 is preferably brought about by wrapping the webs 2 and 3 about one or more heated rolls to bring the thermoplastic layer 3 up to or near its melting point. The two plies 2 and 3 are then passed through the nip of a heated roll and a back-up roll under controlled conditions of temperature, pressure and web speed to achieve the above noted controlled-depth penetration, resulting in stabilization of rayon ply 2 to form the stabilized web 1. Preheating of webs 2 and 3, while not necessary, is advantageous because it enables greater line speeds.

The pressure applied to webs 2 and 3 in the nip should not exceed 6.89×10$^3$ newtons per square meter and depends upon a number of variables such as the type and thickness of rayon the thermoplastic webs used, diameter of the heated and back-up rolls, back-up roll characteristics, and nip loading. The temperature of the heated roll is at or above the melting point of the thermoplastic layer 3. Factors affecting the temperature chosen include, diameter of the heated roll, line speed, melting point of the thermoplastic web 3, insulative characteristics of the rayon web 2 (which should be adjacent the heated roll) and whether or not webs 2 and 3 have been preheated. Once a satisfactory line speed has been chosen, one skilled in the art can readily determine the above listed factors by routine experimentation to assure that web 3 is melted and caused to penetrate web 2 to a controlled depth of from about 10% to about 40%, and preferably from about 10% to about 25%.

Figure 3:
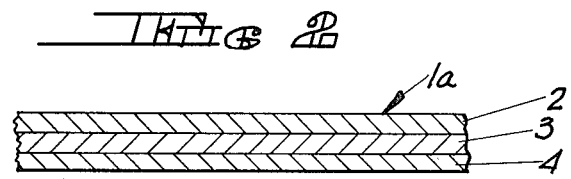
FIG. 3 is a fragmentary, semi-diagrammatic cross sectional view of a stabilized rayon web of the type illustrated in FIG. 1 which was simultaneously overall heat bonded to a second rayon web to form a stabilized unit.

It is possible during the above described stabilizing procedure to simultaneously bond the rayon web or ply 2 to another web or ply with the thermoplastic web therebetween. FIG. 3 illustrates a stabilized 3-ply unit, generally indicated at 1a. This material comprises a rayon ply and a thermoplastic ply identical to those of FIG. 1 and like parts have been given like index numerals. A third web or ply 4 is bonded to the ply 2 by the thermoplastic ply 3 and may take the form of another rayon web. The ply 4 may or may not be identical to the ply 2. When two rayon plies are used, the bonding may be conducted in such a way that both rayon plies 2 and 4 are stabilized.

Figure 4:
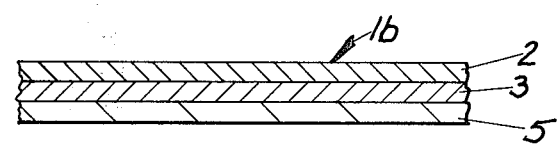
FIG. 4 is a fragmentary, semi-diagrammatic, cross sectional view similar to FIG. 2 and illustrating a stabilized rayon web of the type shown in FIG. 1 to which a tissue ply was simultaneously overall heat bonded.
Figure 5:
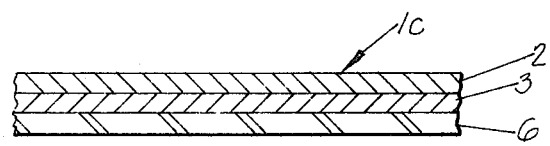
FIG. 5 is a fragmentary, semi-diagrammatic, cross section view similar to FIG. 2 and illustrating a web of the type shown in FIG. 1 to which a melt blown ply was simultaneously overall heat bonded.

Another stabilized unit or 3-ply web is generally indicated at 1b in FIG. 4. This material comprises a stabilized rayon web similar to that shown in FIG. 1 (and like parts have been given like index numerals) to which an additional tissue ply 5 has been simultaneously bonded. FIG. 5 is similar to FIGS. 3 and 4 and illustrates another stabilized unit or 3-ply web, generally indicated at 1c. The material comprises a stabilized rayon of the type shown in FIG. 1 (and again like parts have been given like index numerals) to which a melt blown web 6 has been simultaneously bonded.

The stabilized rayon web of the present invention has many and varied uses. For example, it has been found that when a structure of the type described with respect to FIG. 3 is made up, the resulting structure compares favorably to conventional cotton gauze in its cloth-like aesthetics and strength properties and is more absorbent than conventional cotton gauze. This material can be used as a surgical sponge or, in many instances, as a gauze substitute.

Figure 6:
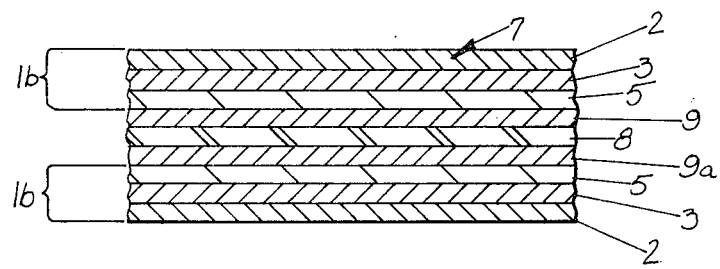
FIG. 6 is a fragmentary, semi-diagrammatic, cross sectional view of a washcloth structure utilizing as outer plies the stabilized unit of FIG. 4.

FIG. 6 is a fragmentary, semi-diagrammatic, cross sectional view of an exemplary disposable, nonwoven washcloth utilizing a stabilized rayon web of the present invention as its outer plies. The washcloth is generally indicated at 7 and its outer plies are identical to the stabilized unit illustrated at 1b in FIG. 4. As a result, like parts have again been given like index numerals. The centermost ply 8 of the structure is a thermoplastic ply treated with a surfactant to render it hydrophilic. To either side of the centermost thermoplastic ply 8 there are provided additional hydrophobic, open, thermoplastic plies 9 and 9a. The plies 9 and 9a have a lower melting point than centermost ply 8 and serve as a dry adhesive to join the outer plies or stabilized units 1b to the center ply 8.

The resulting washcloth structure is cloth-like, soft flexible and strong. It demonstrates good web bulk and about the same absorbency as a terry cloth washcloth of equivalent weight.

Figure 7:
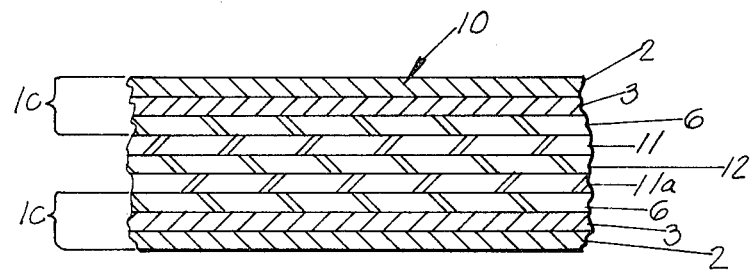
FIG. 7 is a fragmentary, semi-diagrammatic, cross sectional view of a towel utilizing as outer plies a stabilized unit of the type illustrated in FIG. 5.

FIG. 7 illustrates a disposable, nonwoven towel, generally indicated at 10, which is made up utilizing outer or cover plies equivalent to the stabilized unit illustrated at 1c in FIG. 5 (like parts having been given line index numerals). The melt blown layers 6 are hydrophilic, having been treated with a wetting agent.

Plies 11 and 11a are identical and are fluff plies. The centermost ply 12 is a surfactant treated, thermoplastic ply.

Figure 8:
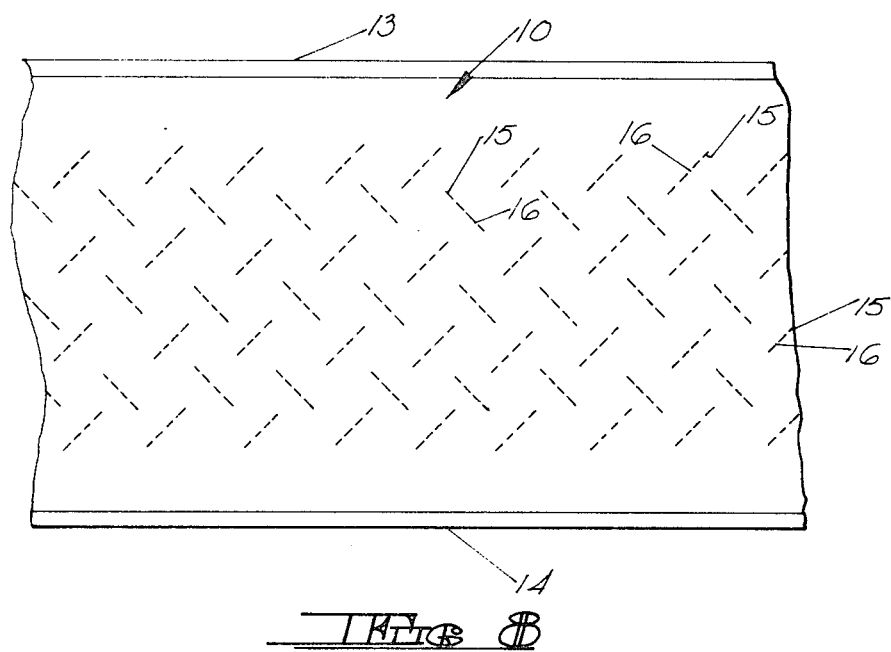
FIG. 8 is a fragmentary plan view of the towel of FIG. 7 illustrating both edge bonding and spot bonding.

The entire structure is heat sealed together about its peripheral edges. This edge bonding is illustrated at 13 and 14 in FIG. 8. When additional bonding is desired or required to prevent the plies 11, 11a and 12 from slipping or shifting with respect to each other and with respect to the stabilized units 1c, spot heat bonding may be employed. In FIG. 8, the towel 12 is illustrated as being uniformly point bonded by individual point bonds 15 arranged in rows 16. The rows 16, in turn, are arranged in a decorative "chevron" pattern. The spot bonding illustrated in FIG. 8 is exemplary only. Continuous or discontinuous pattern bonding, uniform or random point bonding, or combinations thereof could be used, as is well known in the art.

It will be understood by one skilled in the art that at each individual bond position the towel structure is stiffened and its absorptive properties are reduced. Nevertheless, when appropriately designed and positioned, the bonds will cause no appreciable effect on the hand of the overall towel structure and no significant effect on its absorptive properties. It will further be understood that the edge bonding and spot bonding could be accomplished through the use of any appropriate bonding agents. Such bonding agents are numerous, readily available and their uses are well known in the art. For example, the most commonly used bonding agents are acrylic latexes, styrene butadiene copolymers, ethylene vinyl acetate, or a hot melt such as polyethylene.

The disposable towel 10 is more absorbent and more lint free than terry cloth towels for the same purpose.

Figure 9:
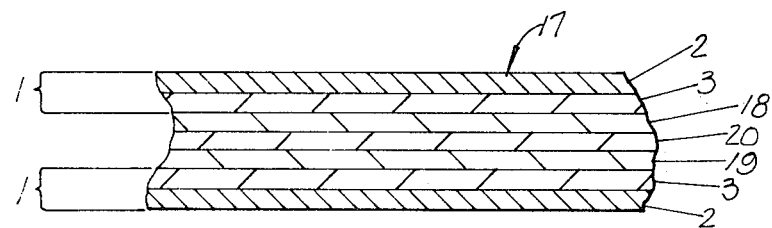
FIG. 9 is a fragmentary, semi-diagrammatic, cross section view of an exemplary surgical towel utilizing as outer plies a stabilized rayon web of the type shown in FIG. 1.

FIG. 9 illustrates an exemplary surgical towel which is made up employing outer plies of stabilized rayon similar to the stabilized rayon ply described with respect to FIG. 1 (and like parts have been given like index numerals). The center of the surgical towel 17 is made up of two identical tissue plies 18 and 19 located to either side of a thermoplastic ply 20. The centermost thermoplastic ply 20 not only added bulk to the structure but also serves as a dry adhesive. the overall structure is edge bonded and spot bonded in any of the ways described with respect to FIG. 8.

Figure 10:
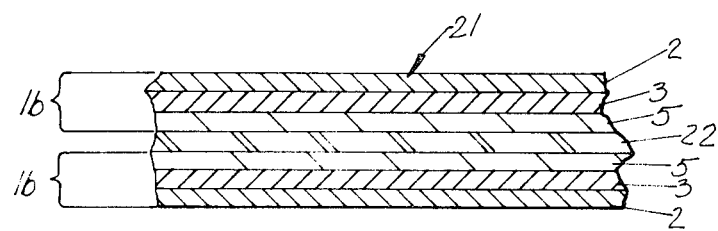
FIG. 10 is a fragmentary, semi-diagrammatic, cross sectional view of another exemplary surgical towel utilizing as outer plies a stabilized unit of the type illustrated in FIG. 4.

FIG. 10 illustrates another embodiment of nonwoven, disposable surgical towel generally indicated at 21. This towel is made up with outer plies equivalent to the stabilized unit illustrated at 1b in FIG. 4 (and like parts have been given like index numerals). Located between the outer plies or stabilized units 1b is a thermoplastic ply 22 treated with a surfactant to render it hydrophilic. This ply not only enhances the absorbency and bulk of surgical towel 21, but also serves as a dry adhesive to join the stabilized units 1b together. The overall structure is edge and spot bonded in any of the ways described with respect to FIG. 8. The melt blown polypropylene ply 22 could be replaced by a polypropylene "Sharnet" ply of the type illustrated at 20 in FIG. 9 or a polyethylene "Delnet" ply.

The surgical towel of FIGS. 9 and 10 are more absorbent than cloth surgical towels of equivalent weight and are far lower in release of particulate material or lint than conventional cloth surgical towels.

FIGS. 11 through 15 diagrammatically illustrate various embodiments of surgical sponges of the type commonly known as "4 ×4" sponges. Such surgical sponges are conventionally made of cotton gauze folded to form a structure 4 inches (10.2 cm) by 16 inches (40.6 cm). This structure is then folded to form a 4 inch (10.2 cm) by 4 inch (10.2 cm) sponge structure.

Figure 11:
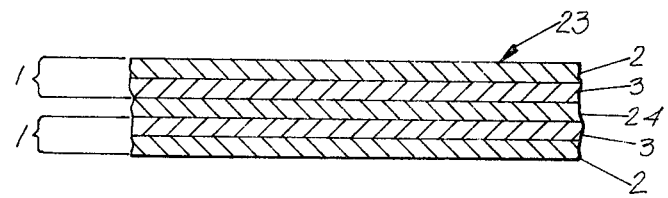
FIGS. 11 through 15 are fragmentary, semi-diagrammatic, cross sectional views illustrating exemplary constructions for 4×4 surgical sponges incorporating the stabilized rayon webs of the present invention.

Turning first to FIG. 11, an exemplary surgical sponge is generally indicated at 23 and comprises two outer stabilized rayon plies of the type indicated at 1 in FIG. 1 (like parts having been given like index numerals) and an intermediate absorbent ply 24. The overall structure was heat spot bonded in a fashion similar to that described with respect to FIG. 8.

Figure 12:
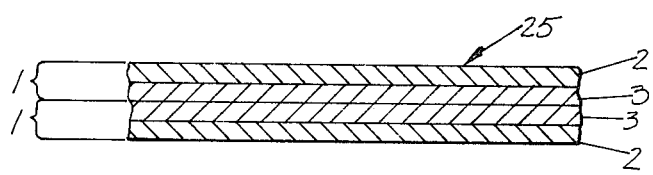

FIG. 12 illustrates a 4×4 surgical sponge embodiment 25 which is made up of two layers of stabilized rayon of the type illustrated and described with respect to FIG. 1. In this embodiment, the rayon plies are stabilized with a thermoplastic web 3 of "Delnet". The stabilized structures 1 are joined together by pattern heat spot bonding of the type shown in FIG. 8. The stabilized structure may also be overall heat bonded together.

Figure 13:
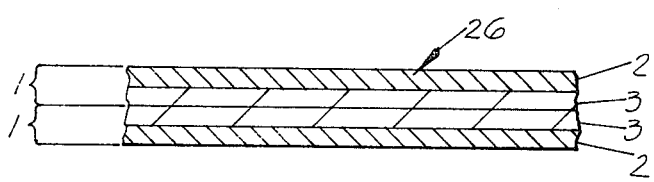

FIG. 13 illustrates another embodiment of 4×4 surgical sponge, generally indicated at 26. This embodiment is similar to that of FIG. 12 in that it comprises a pair of stabilized rayon plies. This embodiment differs from that of FIG. 12 in that the rayon plies are stabilized with a thermoplastic web 3 of "Sharnet". Again, the stabilized rayon layers were joined together by pattern spot bonding. As in the case of the structure of FIG. 12, the stabilized structures 1 of FIG. 13 may be overall heat bonded together.

Figure 14:
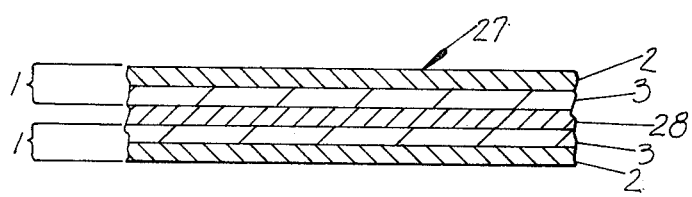

In FIG. 14 another 4×4 surgical sponge is generally indicated at 27. The sponge comprises two outer plies of the type indicated at 1 in FIG. 1 (like parts having been given like index numerals) and an intermediate or centermost thermoplastic ply 18. In an exemplary embodiment the rayon plies 2 are each stabilized by a "Sharnet" ply and the centermost thermoplastic ply 28 is a "Delnet" ply. It will be understood that ply 28 could be a "Sharnet" ply.

Figure 15:
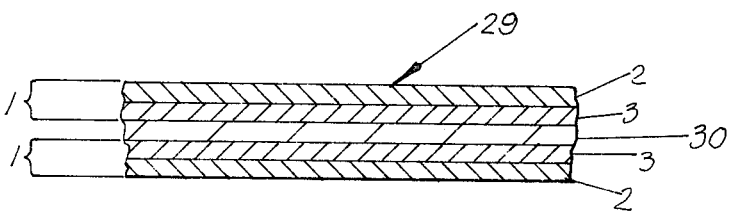

The 4×4 surgical sponge of FIG. 15, generally indicated at 29, is similar to that of FIG. 14. The sponge again comprises two outer plies of the type indicated at 1 in FIG. 1 (like parts having been given like index numerals) and an intermediate or centermost thermoplastic ply 30. This embodiment differs from that of FIG. 14 in that rayon plies 2 are each stabilized by a "Delnet" ply and the centermost thermoplastic ply 30 is a "Sharnet" ply. As in the case of the embodiment of FIG. 14 the centermost ply 30 could be a "Delnet" ply.

In all of the embodiments of FIGS. 11 through 15, the finished 4×4 structure may be mechanically treated by compacting or creping to achieve greater softness and less stiffness. Alternatively, the stabilized rayon webs may be so treated prior to their incorporation in the sponge structure. All of the embodiments of 4×4 sponges of FIG. 11 through 15 are made up as 4 inch (10.2 cm) by 16 inch (40.6 cm) structures folded to form 4 inch (10.2 cm) by 4 inch (10.2 cm) sponges. They all demonstrate excellent characteristics for surgical use. They are soft, pliable, conformable and substantially free of particulate discharge. The stabilized rayon surfaces of the 4×4's have sufficient texture to enable them to wipe up liquids of various viscosities and liquids containing solids, while at the same time being nonabrasive to the skin. Even when wet, they demonstrate excellent wet bulk and dimensional stability, with little elongation. Their cloth-like aesthetics compare favorably to conventional cotton gauze 4×4's and their absorbency is greater than conventional cotton gauze 4×4's. It will be understood that the 4×4 surgical sponges of FIGS. 11 through 15 can be provided with radio opaque markers or indicators, as is well known in the art.

TEST PROCEDURES

The test procedures used to determine the unique properties of the stabilized rayon webs and products made therefrom and to engender the test results provided in the Examples below are as follows:

TENSILE, ELONGATION AND WORK TO BREAK TESTS

A 5.1 cm wide strip of the materials for which these properties are to be determined is tested in an Instron Table Model TM with a tension local cell "C" (range 4.4–22.2 newtons). All test samples are conditioned at least 12 hours at 23 ±1° C. and 50 ±2% relative humidity. An initial jaw spacing of 5.08 cm is used together with a crosshead speed of 5.08 centimeters per minute. The tensile strength is reported as tensile to break in newtons per meter. A high value is desired. Elongation is reported in percent and a low value is desired. Work to complete break is reported in joules per square meter. A high value is desired.

TEAR STRENGTH TEST

Tear strength is determined using an Elmendorf Tearing Tester and ASTM Test Method D-1424, with the exception that the sample is conditioned at 23 ±1° C. and a relative humidity of 50 ±2% for 12 hours. The value is reported in grams and a high value is desired.

WET ABRASION RESISTANCE TESTS

Samples of fabrics to be tested are cut into 15.2 cm ×15.2 cm squares with a 1.3 cm diameter hole cut in the center. Each sample is placed on a Taber Abraser-Research Model and the weight is set to a 125 gram load per wheel. CS-8 wheels are used. Two milliliters of water are put on the sample and the wheels via pipette. The Abraser is run until the sample has subjectively failed (as for example by surface fiber disentanglement, stretching or the appearance of holes). The number of cycles to failure is reported and a high value is desired.

DROP ABSORBENCY TEST

This test measures the time in seconds for a drop of water to become completely absorbed by the material being tested. The test specimen is conditioned at least 12 hours at 23 ±1° C. and 50 ±2% relative humidity. The test specimen is placed between holding plates in a manner which leaves the center unsupported but prevents sag. A drop of water is applied to the spceimen. The time begins when the drop of water makes contact on the surface of the specimen and stops when the glistening effect of the drop of water disappears. Low numbers are desired.

ABSORBENT CAPACITY TEST

This test determines the number of grams of water absorbed per gram of sample tested. The test sample (10.2 cm ×10.2 cm) is first conditioned at least 12 hours at 23 +1° C. and 50 ±2% relative humidity. The sample is thereafter saturated with water on a holder mounted on an inclined platform. The test sample is subjected to the pressure loading desired. The absorbent capacity is determined from the initial dry weight and the final saturated weight of the test sample. Different pressure loadings may be used. High numbers are desired.

VERTICAL WICKING RATE

Samples to be tested are conditioned for at least 12 hours at 23±1° C. and 50±2% relatively humidity. The samples are pressed between metal faces and are trimmed to provide 10.2 cm ×10.2 cm samples. The prepared samples are placed vertically in a sample holder with at least 2 electrodes contacting the pad near the bottom and near the top edges. The time period for wicking is commenced when contact is made between two bottom electrodes and ended when contact is made between two top electrodes. The time for water to wick up the vertical pad is recorded. The wicking rate is recorded in centimeters per second. This test indicates the rate of vertical water absorption in a standard sample and high numbers are desired.

DRIP CAPACITY

In testing for drip capacity, a test sample is prepared as for the wicking rate test above. The sample is placed on a 1.3 cm—spaced square mesh wire cloth support. Water, flowing at the rate of 1 ml/sec is allowed to drip onto the center of the sample. The time required for the sample to release the first drop of water from its underside is recorded, and the drip capacity is reported in grams water/grams test sample. This test indicates the ability of a standard sample to hold and distribute water and high numbers are desired.

DRY LINT RELEASE TEST

This test uses an electric clothes dryer (without heat), with modifications, and measures the lint or particulate matter released by the test sample in milligrams per square meter. The samples to be tested are conditioned for at least 12 hours at 23 ±1° C. and 50 ±2% relative humidity. The modifications to the electric dryer include a baffle arrangement to increase sample tumbling action and the use of one-way intake and exhaust filters designed to catch only lint or particulate material released from the test sample. The test sample is allowed to tumble for exactly 30 minutes. Low values are desired.

ABSORBENT CAPACITY AND WICKING RATE DETERMINED AT ZERO HYDROSTATIC HEAD

The absorbent capacity in grams of water absorbed per grams of sample tested and the rate at which the water is absorbed in grams of water per second is determined using the method described by Bernard M. Lichstein in SYMPOSIUM PAPERS—TECHNICAL SYMPOSIUM—NONWOVEN PRODUCT TECHNOLOGY, Mar. 5-6, 1974, Shoreham Americana, Washington, D.C., pp. 129–142. Exceptions to the method described are: (1) the use of a pressure applied to the sample of 34 newtons per square meter, and (2) the causing of a portion of the sample to momentarily contact the water meniscus to thereby initiate wicking, rather than momentarily pumping the water to the sample. For these determinations, high numbers are desired.

EXAMPLES

The following are examples of the stabilized rayon web structure of the present invention and structures made therefrom.

EXAMPLE 1

A stabilized web of the type illustrated in FIG. 1 was made utilizing a "Bemliese" web having a basis weight of 30 g/m$^2$ and a polyethylene "Delnet" web having a basis weight of 11 g/m$^2$. The "Delnet" penetrated the "Bemliese" web to from about 10% to about 20%.

EXAMPLE 2

Another example of a stabilized web of the type illustrated in FIG. 1 was made utilizing a "Bemliese" web having a basis weight of 30 g/m$^2$ and a polyethylene "Delnet" web having a basis weight of 18 g/m$^2$. The "Delnet" penetrated the "Bemliese" web to from about 10% to about 20%.

The stabilized webs of Examples 1 and 2, together with an unstabilized "Bemliese" web having a basis weight of 30 g/m$^2$, were tested for wet and dry tensile strength, wet and dry elongation, wet abrasion resistance and drop absorbency. The results are given in Tables I and II below:

TABLE I

| | Tensile Strength (newtons/meter) | | | | Elongation (%) | | | |
|---|---|---|---|---|---|---|---|---|
| | Dry | | Wet | | Dry | | Wet | |
| Examples | MD | CD | MD | CD | MD | CD | MD | CD |
| Unstabilized "Bemliese" | 403 | 315 | 228 | 158 | 80 | 130 | 140 | 180 |
| Example 1 | 595 | 298 | 280 | 333 | 60 | 110 | 110 | 160 |
| Example 2 | 613 | 368 | 315 | 193 | 50 | 93 | 98 | 134 |

TABLE II

| Examples | Wet Abrasion Resistance (Cycles) | Drop Absorbency (Seconds) |
|---|---|---|
| Unstabilized "Bemliese" | 11 | 1.1 |

TABLE II-continued

| Examples | Wet Abrasion Resistance (Cycles) | Drop Absorbency (Seconds) |
|---|---|---|
| Example 1 | 28 | 1.3 |
| Example 2 | 32 | 2.0 |

As will be noted from Tables I and II, the tensile strength of the stabilized examples improved, both in the dry and wet state, as compared to the unstabilized "Bemliese". Elongation, related to the dimensional stability, was reduced both in the wet and dry state. The surface stability of the stabilized rayon webs was significantly improved over that of the unstabilized "Bemliese". Table II shows that drop absorbency was not seriously impaired by stabilization.

EXAMPLE 3

A gauze-like structure of the type described with respect to FIG. 3 was made utilizing two identical layers of "Bemliese" of a basis weight of 30 g/m$^2$ and an intermediate layer of polyethylene "Delnet" of a basis weight of 18 g/m$^2$. The material was passed through the combination of a heated drum and a cooperating apron. This procedure was repeated with the material reversed side-for-side. Both "Bemliese" layers were stabilized with from about 10% to about 15% penetration by the "Delnet" into both "Bemliese" layers. The stabilized material was compacted with a conventional heating roll-belt assembly. The gauze-like structure of example 3, having a basis weight of 78 g/m$^2$, was compared to a four-ply meshed cotton gauze structure having a basis weight of 146 g/m$^2$. The results are given in Table III below:

TABLE III

| | Work To Break (Toughness) (joules/m$^2$) | | | | Absorptive Capacity At Zero Hydrostatic Head (g/g) | Wicking Rate (g/sec) |
|---|---|---|---|---|---|---|
| | Dry | | Wet | | | |
| Examples | MD | CD | MD | CD | | |
| Cotton Gauze | 701 | 350 | 858 | 403 | 4.0 | .04 |
| Example 3 | 841 | 631 | 560 | 333 | 10.4 | .11 |

Table III indicates that the gauze-like structure of Example 3 had about 2.5 times greater absorptive capacity than the cotton gauze structure. It was far better in wicking rate and compared favorably in strength.

EXAMPLE 4

The disposable washcloth of FIG. 6 was made having outer plies of the type shown at 1b in FIG. 4. The plies 2 comprised "Bemliese" having a basis weight of 25 g/m$^2$. The thermoplastic layers 3 comprised polyethylene "Delnet" of a basis weight of 11 g/m$^2$ while the tissue layers 5 each comprised a printed or colored facial grade tissue sold by The Proctor & Gamble Paper Products Company of Cincinnati, Ohio, under the trademark "Puffs", and were of a basis weight of 15 g/m$^2$. The centermost ply 8 of the structure was a melt blown polypropylene ply treated with a surfactant to render it hydrophilic. While any appropriate wetting agent may be used, in this instance the wetting agent was manufactured by Textilana Corporation of Hawthorne, California, under the trade name "Veletex BCW" (a biodegradable, chemically stable, liquid coco fatty betaine). The melt blown polypropylene ply 8 had a basis weight of 45 g/m². To either side of the centermost melt blown ply 8 there was provided identical polyethylene "Delnet" plies 9 and 9a. These "Delnet" plies had a basis weight of 11 g/m². The purpose of these "Delnet" plies was simply to serve as a dry adhesive to join the outer plies or stabilized units 1b to the melt blown center ply 8.

In the preparation of the disposable washcloth of FIG. 5, the outer plies or stabilized units 1b were made up in the manner described with respect to FIG. 4 and compacted. These stabilized units were laid up with the "Delnet" plies 9 and 9a and the melt blown centermost ply 8 and caused to pass between a heated drum and a cooperating felt apron, once on each side, so that the entire structure was overall bonded. The structure was thereafter compacted. The resulting washcloth was clothlike, soft, flexible and strong. It demonstrated good wet bulk and about the same absorbency as a terry cloth washcloth of equivalent weight.

The washcloth of Example 4 had a basis weight of 197 g/m² and was compared with a conventional terry cloth washcloth having a basis weight of 346 g/m². The results are given in Tables IV and V below:

TABLE IV

| Example | Absorbent Capacity (g/g at 6.89 × 10³n/m2) | Vertical Wicking Rate (cm/sec) | Drip Capacity (g/g) |
|---|---|---|---|
| Terry Cloth Washcloth | 4.2 | .04 | 4.2 |
| Example 4 Washcloth | 3.9 | .26 | 3.7 |

TABLE V

| Example | Lint (mg/m²) | Tear Strength (g) MD | Tear Strength (g) CD |
|---|---|---|---|
| Terry Cloth Washcloth | 145 | 1600+ | 1600+ |
| Example 4 Washcloth | 16 | 1200+ | 1200+ |

Tables IV and V show that the absorptive properties of the washcloth of Example 4 were comparable to those of the terry cloth washcloth while lint release was greatly reduced. The strength of the washcloth of Example 4 was excellent.

EXAMPLE 5

A disposable, nonwoven towel of the type shown in FIG. 7 was made up utilizing outer or cover plies equivalent to the stabilized unit illustrated in FIG. 5. Specifically the outermost plies 2 were "Bemliese" having a basis weight of 25 g/m². The stabilizing thermoplastic plies were polyethylene "Delnet" having a basis weight of 11 g/m² and the plies 6 were identical melt blown polypropylene plies having a basis weight of 15 g/m², treated with a wetting agent. In this instance the same wetting agent was used as described with respect to ply 8 of FIG. 6. Plies 11 and 11a were identical and were air laid fluff plies of comminuted wood pulp fibers, each having a basis weight of 25 g/m². The centermost ply 12 was a melt blown polypropylene ply, surfactant treated, and identical to plies 6, having a basis weight of 15 g/m². The overall towel structure was constructed by first making up the outermost plies 1c in the same manner described with respect to the stabilized unit 1c of FIG. 5 and compacting them. The outer plies 1c were laid up with the fluff plies 11 and 11a and the centermost melt blown polypropylene ply 12 and the entire structure was heat sealed together about its peripheral edges. Additional bonding was desired to prevent the plies 11, 11a and 12 from slipping or shifting with respect to each other and spot heat bonding in a chevron pattern (as shown in FIG. 8) was employed.

The towel of Example 5, having a basis weight of 169 g/m², was compared to a terry cloth towel having a basis weight of 344 g/m². Results are presented in Tables VI and VII below:

TABLE VI

| Example | Absorbent Capacity (g/g at 6.89 × 10³n/m²) | Vertical Wicking Rate (cm/sec) | Drip Capacity (g/g) |
|---|---|---|---|
| Terry Cloth Towel | 4.0 | .04 | 8.1 |
| Example 5 Towel | 7.3 | .43 | 22.1 |

TABLE VII

| Example | Lint (mg/m²) | Tear Strength (g) MD | Tear Strength (g) CD |
|---|---|---|---|
| Terry Cloth Towel | 162 | 1600+ | 1600+ |
| Example 5 Towel | 34 | 1400 | 1040 |

The absorbent properties and lint release properties of the disposable towel of Example 5 are shown by Tables VI and VII to be far superior to that of the terry cloth towel. The strength of the towel of Example 5 was excellent.

EXAMPLE 6

An exemplary surgical towel of the type shown in FIG. 9 was made up employing outer plies of stabilized rayon similar to the stabilized rayon ply described with respect to FIG. 1. In the specific embodiment made up, the rayon plies 2 were "Bemliese" having a basis weight of 30 g/m² and the stabilizing thermoplastic plies 3 were polyurethane "Sharnet" having a basis weight of 20 g/m². The center of the surgical towel 17 was made up of two identical, colored, tissue plies 18 and 19, made on a conventional tissue machine and having a basis weight of 15 g/m². The tissue plies were located to either side of a thermoplastic polypropylene "Sharnet" ply 20 having a basis weight of 6 g/m².

The stabilized units 1 were made in the manner described with respect to FIG. 1 and were laid up with the tissue plies 18 and 19 and the centermost "Sharnet" ply 20. The overall structure was then heat edge bonded and spot boned in the manner described with respect to FIG. 8.

EXAMPLE 7

Another embodiment of nonwoven, disposable surgical towel (of the type illustrated in FIG. 10) was made. This towel was made up with outer plies equivalent to the stabilized unit illustrated at 1b in FIG. 4. Specifically, the outemost rayon plies 2 were "Bemliese" with a basis weight of 25 g/m² stabilized with thermoplastic webs 3 in the form of polyethylene "Delnet" with a basis weight of 11 g/m² and simultaneously bonded to colored tissue plies 5 (of the type described in Example 6) and having a basis weight of 15 g/m². Located between the outer plies or stabilized units 1b was a ply 22 of melt blown polypropylene having a basis weight of 15 g/m². The melt blown polypropylene web 22 was treated with "Veletex BCW" surfactant to render it hydrophilic.

The surgical towel 21 was constructed by first forming the outer plies or stabilized units 1b in the manner described with respect to FIG. 4 and compacting them. These plies were then laid up with the intermediate melt blown polypropylene ply 22 and the overall structure was heat edge bonded and spot bonded in the manner described with respect to FIG. 8. It will be understood by one skilled in the art that the melt blown polypropylene ply 22 could be replaced by a polypropylene "Sharet" ply of the type illustrated at 20 in FIG. 8 or a polyethylene "Delnet" ply.

The nonwoven surgical towel of Example 7 (having a basis weight of 135 g/m²) was compared to a conventional nonwoven cotton surgical towel (having a basis weight of 297 g/m²). The results are set forth in Tables VIII and IX below:

TABLE VIII

| Example | Absorbent Capacity (g/g at 6.89 × 10³n/m²) | Vertical Wicking Rate (cm/sec) | Drip Capacity (g/g) |
| --- | --- | --- | --- |
| Woven Surgical Towel | 2.9 | .89 | .88 |
| Example 7 Surgical Towel | 5.5 | 1.26 | 3.44 |

TABLE IX

| Example | Lint (mg/m²) | Tear Strength (g) MD | CD |
| --- | --- | --- | --- |
| Woven Surgical Towel | 25 | 1600+ | 1600+ |
| Example 7 Surgical Towel | 4 | 1270 | 1380 |

The absorbency and lint release properties of the disposable towel of Example 7 are shown in Tables VIII and IX to be far superior to that of the woven surgical towel. The strength of the towel of Example 7 was excellent.

EXAMPLE 8

A surgical 4×4 sponge was made of the type shown in FIG. 11 comprising two outer stabilized plies as shown at 1 in FIG. 1 and an intermediate absorbent ply 24. In this Example the rayon plies were "Bemliese" having a basis weight of 30 g/m² and stabilized by means of polyethylene "Delnet" plies, having a basis weight of 11 g/m². The intermediate absorbent layer 24 was "Bemliese" having a basis weight of 30 g/m². The stabilized rayon plies were compacted and the overall structure was heat spot bonded in a fashion similar to that described with respect to FIG. 8.

EXAMPLE 9

A 4×4 surgical sponge, as shown in FIG. 12, was made up of two layers of stabilized rayon of the type illustrated and described with respect to FIG. 1. The plies 1 each comprised a "Bemliese" web 2 of a basis weight of 30 g/m² stabilized with a thermoplastic web 3 of polyethylene "Delnet", having a basis weight of 11 g/m². The stabilized structures were compacted and joined together by pattern heat spot bonding of the type shown in FIG. 8. The stabilized structure could be overall heat bonded together if desired.

EXAMPLE 10

Another embodiment of 4×4 surgical sponge was made after the manner of the sponge illustrated in FIG. 13. It comprised a pair of stabilized rayon plies each constituting a "Bemliese" web of a basis weight of 30 g/m² stabilized with a thermoplastic web of polypropylene "Sharnet", having a basis weight of 6 g/m². Again, the stabilized rayon layers were compacted and joined together by pattern heat spot bonding. As in the case of the structure of Example 9, the sponge of Example 10 could be overall heat bonded.

EXAMPLE 11

A 4×4 surgical sponge of the type illustrated at 27 in FIG. 14 was made. The rayon plies 2 constituted "Bemliese" and had an initial basis weight before stabilization of 30 g/m². The stabilizing thermoplastic plies 3 were polypropylene "Sharnet" plies having a basis weight of 6 g/m². The centermost hydrophobic thermoplastic ply 28 was a polyethylene "Delnet" web having a basis weight of 18 g/m². The absorbent stabilized rayon plies 2–3 were laid up with the hydrophobic thermoplastic ply 28 and the entire structure was heat spot bonded in a chevron pattern of the type illustrated in FIG. 8.

EXAMPLE 12

A 4×4 surgical sponge of the type illustrated in FIG. 15 was constructed wherein the rayon plies 2 were "Bemliese" plies having a basis weight of 30 g/m². The stabilizing thermoplastic plies 3 were polyethylene "Delnet" webs having an initial basis weight of 18 g/m². The centermost hydrophobic thermoplastic layer 10 was a polypropylene "Sharnet" web having a basis weight of 6 g/m². The structure was heat bonded in the same manner described with respect to Example 1.

The 4×4 surgical sponges of Example 9 through 12 were compared with a conventional four-ply cotton gauze 4×4 surgical sponge. The sponges of Examples 8 through 12 had basis weights of 82, 72, 90 and 102 g/m², respectively. The cotton 4×4 sponge had a basis weight of 145 g/m². Tables X and XI tabulate the results.

TABLE X

| Example | Absorbent Capacity At Zero Hydrostatic Head (g/g) | Wicking Rate At Zero Hydrostatic Head (g/sec) |
| --- | --- | --- |
| 4-ply Gauze sponge | 4.2 | .04 |
| Example 8 Sponge | 10.7 | .23 |
| Example 9 Sponge | 10.2 | .15 |
| Example 10 Sponge | 12.4 | .08 |
| Example 11 Sponge | 11.7 | .07 |
| Example 12 Sponge | 9.4 | .10 |

TABLE XI

| Example | Work to Break (joules/m²) | | | | Lint (mg/m²) |
|---|---|---|---|---|---|
| | Dry | | Wet | | |
| | MD | CD | MD | CD | |
| 4-ply Gauze sponge | 701 | 350 | 858 | 403 | 128 |
| Sponge Example 8 | 999 | 1121 | 718 | 736 | 3 |
| Sponge Example 9 | 631 | 210 | 420 | 123 | 3 |
| Sponge Example 10 | 823 | 561 | 456 | 315 | 3 |
| Sponge Example 11 | 928 | 858 | 595 | 508 | 3 |
| Sponge Example 12 | 841 | 704 | 590 | 464 | 3 |

The surgical sponges of Examples 8 through 12, when compared with the four-ply cotton gauze sponge, demonstrated superior absorption and far superior linting characteristics.

Modifications may be made in the invention without departing from the spirit of it. The spunbonded or discontinuous fiber rayon absorbent layers of the present invention, while preferably all rayon, may contain other filaments or fibers in an amount such that they will not detract from the performance and aesthetics of the absorbent rayon layers.

The embodiments of the invention in which an exclusive property or privilege is claimed are defined as follows:

1. An absorbent, nonwoven, stabilized web comprising a binderless nonwoven rayon web having a substantial Z direction fiber orientation with a nonwoven web of thermoplastic material melted into said rayon web from one surface of said rayon web to a penetration depth of from about 10% to about 40%, and preferably from about 10% to about 25% of the thickness of said rayon web, said rayon web having an initial basis weight before stabilization of from about 20 to about 75 grams per square meter and said thermoplastic web having an initial basis weight of from about 5 to about 25 grams per square meter and an open area of at least about 40%, said stabilized web having an exposed surface free of said thermoplastic material whereby the surface aesthetics of said rayon web are undisturbed.

2. The structure claimed in claim 1 wherein said rayon web is a spunbonded continuous filament web.

3. The structure claimed in claim 1 wherein said rayon web is a web of discontinuous rayon fibers of at least staple length chosen from the class consisting of an air laid web, a wet laid web, a carded web, an air laid and mechanically needled web, a wet laid and mechanically needled web, a carded and mechanically needled web, an air laid and hydraulically needled web, a wet laid and hydraulically needled web and a carded and hydraulically needled web.

4. The structure claimed in claim 1 wherein said thermoplastic web is chosen from the class consisting of an expanded film web, an extruded and embossed web, a melt blown web and a spunbonded web made from a polymer chosen from the class consisting of polyethylene, polypropylene, ethyl vinyl acetate, ethyl methyl acrylate, polyester, nylon and polyurethane.

5. The structure claimed in claim 1 including a core of at least one ply, said stabilized web being bonded to both sides of said core with its exposed surface facing away from said core to form a composite nonwoven absorbent material.

6. The structure claimed in claim 1 including a second nonwoven rayon web having an initial basis weight before stabilization of from about 20 to about 75 grams per square meter, said second rayon web being bonded to said first mentioned rayon web by said thermoplastic web to form a composite stabilized web, said thermoplastic web being melted into said second rayon web from one side thereof to a penetration depth of from about 10% to about 40%, and preferably from about 10% to about 25% of the thickness of said second rayon web, said second rayon web being stabilized by said thermoplastic material and having an exposed surface free of said thermoplastic material whereby its surface aesthetics are undisturbed.

7. The structure claimed in claim 1 including a hydrophilic ply overall heat bonded to said stabilized web by said thermoplastic web to form a composite nonwoven absorbent web.

8. The structure claimed in claim 1 including a hydrophobic ply overall heat bonded to said stabilized web by said thermoplastic web to form a composite nonwoven absorbent web.

9. The structure claimed in claim 1 including a tissue web overall heat bonded to said stabilized web by said thermoplastic web to form a composite nonwoven absorbent web.

10. The structure claimed in claim 1 including a melt blown thermoplastic web overall heat bonded to said stabilized web by said first mentioned thermoplastic web to form a composite nonwoven absorbent web.

11. The stabilized web claimed in claim 1 being positioned to both sides of a thermoplastic center web with said exposed surface of said stabilized web facing away from said center web, said stabilized web being spot bonded to said center web to form a composite nonwoven absorbent material suitable for the manufacture of four by four surgical sponges.

12. The stabilized web claimed in claim 1 being positioned to both sides of an absorbent center web with said exposed surface of said stabilized web facing away from said center web, said stabilized web being heat spot bonded to said center web to form a composite nonwoven absorbent material suitable for the manufacture of four by four surgical sponges.

13. The stabilized web claimed in claim 1 including a second similar stabilized web, said stabilized webs being positioned adjacent each other with said exposed surfaces thereof facing away from each other, said stabilized webs being bonded together to form a composite nonwoven absorbent material suitable for the manufacture of four by four surgical sponges.

14. The stabilized web of claim 1 including a second identical stabilized web and an absorbent core, said stabilized webs being position to both sides of said absorbent core with their respective exposed surfaces facing away from said core, said core comprising a pair of identical tissue webs and a centermost thermoplastic web, said tissue webs being positioned to both sides of said thermoplastic web, said two stabilized webs and said webs of said core being spot bonded together to form a composite nonwoven absorbent material suitable for the manufacture of surgical towels.

15. The structure claimed in claim 1 wherein said nonwoven rayon web has an initial basis weight before stabilization of from about 20 to about 35 grams per square meter.

16. The structure claimed in claim 6 wherein both of said rayon webs are spunbonded webs.

17. The structure claimed in claim 6 wherein said thermoplastic web melted into each of said rayon webs to said penetration depth is made from a polymer chosen from the class consisting of polyethylene and polypropylene.

18. The structure claimed in claim 7 including a web-like core of at least one ply, said composite nonwoven absorbent web being bonded to both sides of said core with its exposed surfaces facing away from said core to form a composite nonwoven absorbent material.

19. The structure claimed in claim 8 including a web-like core of at least one ply, said composite nonwoven absorbent web being bonded to both sides of said core with its exposed surfaces facing away from said core to form a composite nonwoven absorbent material.

20. The structure claimed in claim 9 including a web-like core of at least one ply, said composite nonwoven absorbent web being bonded to both sides of said core with its exposed surfaces facing away from said core to form a composite nonwoven absorbent material.

21. The composite web of claim 9 including a second identical composite web and an absorbent core, said composite webs being positioned to both sides of said absorbent core with their respective exposed surfaces facing away from said core, said core comprising a pair of identical thermoplastic webs and a hydrophilic melt blown web, said identical thermoplastic webs being positioned to both sides of said hydrophilic melt blown web, said two composite webs and said webs of said core being overall bonded together to form a composite nonwoven absorbent material suitable for the manufacture of disposable washclothes.

22. The composite web of claim 9 including a second identical composite web and a hydrophilic melt blown center webs, said composite web being positioned to both sides of said center web, said two composite webs and said center web being heat spot bonded together to form a composite nonwoven absorbent material suitable for the manufacture of disposable surgical towels.

23. The structure claimed in claim 10 including a web-like core of at least one ply, said composite nonwoven absorbent web being bonded to both sides of said core with its exposed surfaces facing away from said core to form a composite nonwoven absorbent material.

24. The composite web of claim 10 including a second identical composite web, and an absorbent core, said composite webs being positioned to both sides of said absorbent core with their respective exposed surfaces facing away from said core, said core comprising a pair of identical fluff webs and a hydrophilic melt blown web, said fluff webs being positioned to either side of said hydrophilic melt blown web, said two composite webs and said webs of said core being spot bonded together to form a composite nonwoven absorbent material suitable for the manufacture of disposable towels.

25. The structure claimed in claim 11 wherein said rayon web of said stabilized web comprises a spunbonded rayon web.

26. The structure claimed in claim 11 wherein said stabilized web comprises a spunbonded rayon web having melted therein to said penetration depth a polypropylene web, said thermoplastic center web comprising a polyethylene web.

27. The structure claimed in claim 11 wherein said stabilized web comprises a sponbonded rayon web having melted therein to said penetration depth a polyethylene web, said thermoplastic center web comprising a polyethylene web.

28. The structure claimed in claim 12 wherein said stabilized web comprises a stabilized spunbonded web, said absorbent center web comprising a spunbonded center web.

29. The structure claimed in claim 12 wherein said stabilized web comprises a spunbonded rayon web having melted therein to said penetration depth a a polypropylene web, said absorbent center web comprising a spunbonded rayon web.

30. The structure claimed in claim 12 wherein said stabilized web comprises a spunbonded rayon web having melted therein to said penetration depth a polyethylene web, said absorbent center web comprising a spunbonded rayon web.

31. The structure claimed in claim 13 wherein said rayon web of each of said stabilized webs is a spunbonded rayon web.

32. The structure claimed in claim 13 wherein said rayon web of each of said stabilized webs has melted therein to said penetration depth a thermoplastic web made from a polymer chosen from the class consisting of polyethylene and polypropylene.

33. The structure claimed in claim 13 wherein each of said stabilized webs comprises a spunbonded rayon web having a polypropylene web melted therein to said penetration depth.

34. The structure claimed in claim 13 wherein each of said stabilized webs comprises a spunbonded rayon web having a polyethylene web melted therein to said penetration depth.

35. The structure claimed in claim 13 wherein said stabilized webs are heat spot bonded together.

36. The structure claimed in claim 13 wherein said stabilized webs are overall heat bonded together.

37. The structure claimed in claim 14 wherein said rayon web of each of said stabilized webs comprises a spunbonded rayon web.

38. The structure claimed in claim 14 wherein each of said stabilized webs comprises a spunbonded rayon web having melted therein to said penetration depth a polyurethane web, said centermost thermoplastic web comprising a polypropylene web.

39. The structure claimed in claim 21 wherein said rayon web of each of said composite webs comprises a spunbonded web.

40. The structure claimed in claim 21 wherein said rayon web of each of said composite webs comprises a spunbonded web having melted therein to said penetration depth a polyethylene web, said identical thermoplastic webs of said core comprising polyethylene webs and said hydrophilic melt blown web comprising a surfactant-treated polypropylene melt blown web.

41. The structure claimed in claim 22 wherein said rayon web of each of said composite webs comprises a spunbonded web.

42. The structure claimed in claim 22 wherein said rayon web of each of said composite webs comprises a spunbonded rayon web having melted therein to said penetration depth a polyethylene web, said hydrophilic melt blown center web comprising a surfactant treated melt blown polypropylene web.

43. The structure claimed in claim 24 wherein said rayon web of each of said composite webs comprises a spunbonded web.

44. The structure claimed in claim 24 wherein said rayon web of each of said composite webs comprises a spunbonded rayon web having melted therein to said penetration depth a polyethylene web, said melt blown webs of said composite webs and melt blown web of said core each comprising a surfactant treated polypropylene web.

45. The structure claimed in claim 6 including a web-like core of at least one ply, said composite stabilized web being bonded to both sides of said core.

* * * * *

UNITED STATES PATENT AND TRADEMARK OFFICE
CERTIFICATE OF CORRECTION

PATENT NO. : 4,275,105
DATED : June 23, 1981
INVENTOR(S) : William J. Boyd and Mary K. King It is certified that error appears in the above-identified patent and that said Letters Patent are hereby corrected as shown below:

Title page, References Cited, after "3,486,168", "12/1968" should read -- 12/1969 --.

Column 6, line 58, "numberals" should read -- numerals --.

Column 7, line 23, "web" should read -- wet --.

Column 7, line 29, "line" should read -- like --.

Column 10, line 15, "spceimen." should read -- specimen. --.

Column 12, line 31, "example" should read -- Example --.

Column 12, line 61, "Proctor" should read -- Procter --.

Column 14, line 65, "outemost" should read -- outermost --.

Column 15, lines 16-17, "Sharet" should read -- Sharnet --.

Column 18, line 56, "position" should read -- positioned --.

UNITED STATES PATENT AND TRADEMARK OFFICE
CERTIFICATE OF CORRECTION

PATENT NO. : 4,275,105
DATED : June 23, 1981
INVENTOR(S) : William J. Boyd and Mary K. King It is certified that error appears in the above-identified patent and that said Letters Patent are hereby corrected as shown below:

Column 19, line 37, "webs," should read -- web, --.

Column 19, line 53, "either side" should read -- both sides --.

Signed and Sealed this

Sixth Day of October 1981

[SEAL]

*Attest:*

*Attesting Officer*

GERALD J. MOSSINGHOFF

*Commissioner of Patents and Trademarks*